(12) United States Patent
Jacquel et al.

(10) Patent No.: US 9,346,937 B2
(45) Date of Patent: May 24, 2016

(54) PBS- AND SILICA-BASED COMPOSITES

(71) Applicant: ROQUETTE FRERES, Lestrem (FR)

(72) Inventors: Nicolas Jacquel, Lambersart (FR); Rene Saint-Loup, Lomme (FR); Francoise Fenouillot-Rimlinger, L'Isle d'Abeau (FR); Jean-Pierre Pascault, Villeurbanne (FR); Alain Rousseau, Saint Priest (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 14/352,370

(22) PCT Filed: Oct. 16, 2012

(86) PCT No.: PCT/FR2012/052360
§ 371 (c)(1),
(2) Date: Apr. 17, 2014

(87) PCT Pub. No.: WO2013/057423
PCT Pub. Date: Apr. 25, 2013

(65) Prior Publication Data
US 2014/0288239 A1    Sep. 25, 2014

(30) Foreign Application Priority Data

Oct. 17, 2011 (FR) ..................................... 11 59378

(51) Int. Cl.
| | | |
|---|---|---|
| *C08K 3/36* | (2006.01) | |
| *C08J 3/20* | (2006.01) | |
| *C08J 5/18* | (2006.01) | |
| *C08L 67/02* | (2006.01) | |

(52) U.S. Cl.
CPC . *C08K 3/36* (2013.01); *C08J 3/201* (2013.01); *C08J 5/18* (2013.01); *C08J 2367/02* (2013.01); *C08L 67/02* (2013.01)

(58) Field of Classification Search
CPC ............ C08J 3/201; C08K 3/36; C08L 67/02
USPC ......................................... 524/492, 493, 878
See application file for complete search history.

(56) References Cited

U.S. PATENT DOCUMENTS

| | | |
|---|---|---|
| 5,397,827 A | 3/1995 | Kimura et al. |
| 2004/0266917 A1 | 12/2004 | Lepage |
| 2012/0189955 A1* | 7/2012 | Chen et al. ............... 430/137.14 |

FOREIGN PATENT DOCUMENTS

EP        1572795 B1       8/2007

OTHER PUBLICATIONS

Bian, J. et al., "Nonisothermal Crystallization Behavior and Mechanical Properties of Poly(butylene succinate)/Silica Nanocomposites," *Journal of Applied Polymer Science*, 2010, pp. 902-912, vol. 116.

Han, S-I. et al., "In situ polymerized poly(butylene succinate)/silica nanocomposites: Physical properties and biodegradation," *Polymer Degradation and Stability*, 2008, pp. 889-895, vol. 93.

Vassiliou, A.A. et al., "Effect of Evolved Interactions in Poly(butylene succinate)/Fumed Silica Biodegradable in Situ Prepared Nanocomposites on Molecular Weight, Material Properties, and Biodegradability," *Journal of Applied Polymer Science*, 2011, pp. 2010-2024, vol. 119.

* cited by examiner

*Primary Examiner* — Edward Cain
(74) *Attorney, Agent, or Firm* — Saliwanchik, Lloyd & Eisenschenk

(57) ABSTRACT

The present invention relates to PBS- and silica-based composites, said composites having a high swelling ability. It also relates to a method of preparing said composites, a method of swelling said composites and films obtained by swelling said composites.

9 Claims, 1 Drawing Sheet

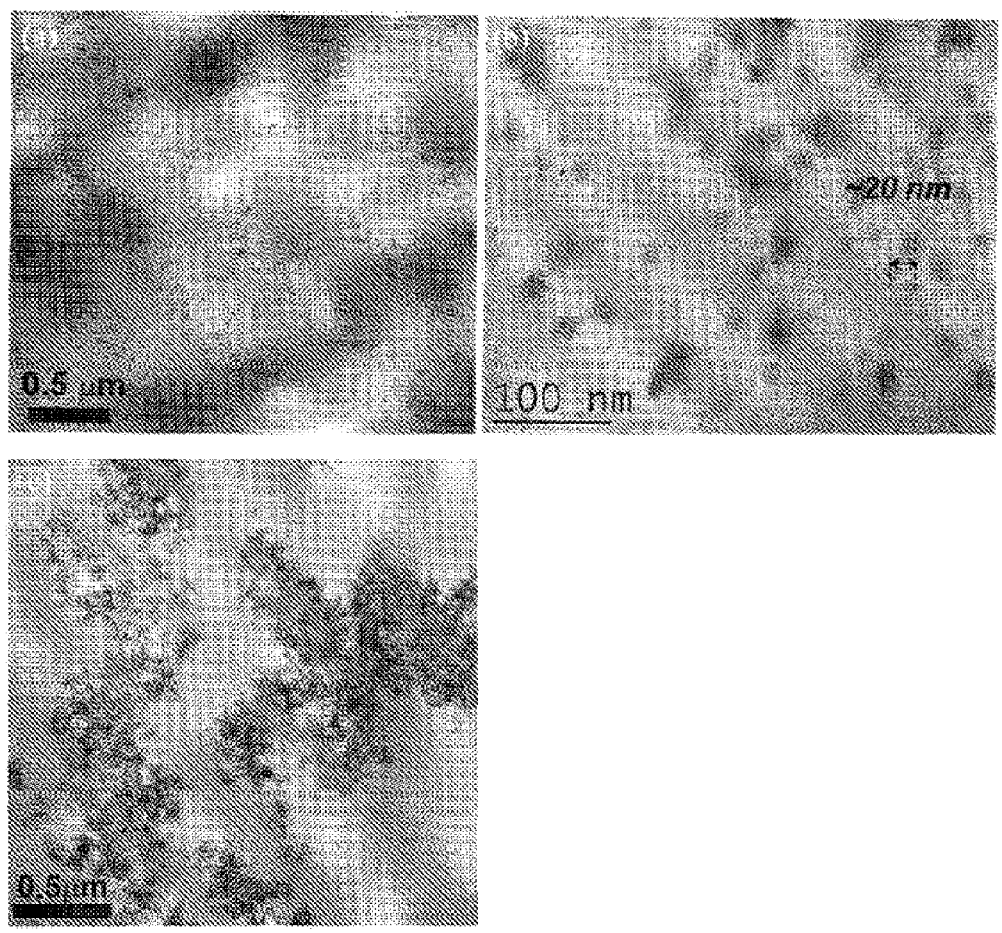

PBS- AND SILICA-BASED COMPOSITES

CROSS-REFERENCE TO RELATED APPLICATIONS

This application is the U.S. national stage application of International Patent Application No. PCT/FR2012/052360, filed Oct. 16, 2012, which claims the benefit of French Patent Application No. 1159378, filed Oct. 17, 2011.

SUMMARY OF THE INVENTION

The present invention relates to PBS- and silica-based composites, said composites having a high film blowing ability. It also relates to a process for preparing these composites, to a process for film blowing of these composites and to films obtained by film blowing of these composites.

TECHNICAL BACKGROUND OF THE INVENTION

Poly(butylene succinate) (PBS), also known as poly(tetramethylene succinate), is a thermoplastic polymer formed by polymerization of succinic acid, or of at least one succinic acid diester, such as dimethyl succinate, and of 1,4-butanediol. PBS is well known and used in particular for applications in which its biodegradability is an asset, for example for the manufacture of disposable cutlery, fishing nets, or mulching films. The films are mainly manufactured by film blowing, this technique enabling the manufacture of films of large size, i.e. films which can reach more than a meter in each of its two dimensions. However, in order to manufacture these films by film blowing, it must be possible for the PBS to be stretched in two dimensions in its molten state, this being preferably without any breaking phenomenon being observed during the preparation of the blown film.

PBS is generally obtained in two steps: in a first step, oligomers are manufactured by means of a reaction in which succinic acid or succinic acid diester and 1,4-butanediol are polyesterified. In a second step, the weight of the polymer is increased by carrying out a reaction in which the oligomers obtained during the first step are transesterified. As it happens, during the synthesis of PBS, the polyesterification and transesterification reactions must be sufficiently long if it is desired for the PBS to be capable of being stretched by film blowing. It follows from this that the productivity of the film-blowable PBS is limited by these long reaction times.

The introduction of fumed silica into the PBS can be carried out by melt-mixing of the polymer with the silica as described by Bian et al. (*J. Appl Pol. Sci.*, 2009, 116, 902-912).

This introduction of fumed silica into the composite can also be carried out by reacting the constituent monomers of the polymer with fumed silica, in situ.

The introduction of fumed-silica nanofillers during the preparation of poly(butylene succinate) films and the improvement of the mechanical properties of the product which results therefrom have already been described by Vassiliou et al. (*J. Appl. Pol. Sci.* 2010, 119, 2010-2024).

Thus, Vassiliou describes an increase in the Young's modulus, the yield stress and the tensile strength, which is accompanied by a decrease in the elongation at break of the poly (butylene succinate) when the amount of fumed silica that is incorporated therein is increased. As it happens, it is important that the materials formed from these composites, in particular blown films, have a high elongation at break and that this elongation is homogeneous, whatever the direction of stress of the material, in particular when these films are used in industrial manufacturing processes.

Furthermore, Vassiliou does not describe the obtaining of a material which is highly film-blowable through the addition of this silica to the PBS.

The preparation of such composites by reaction in situ has also been described by Han et al. (*Pol. Deg and Stab.*, 2008, 116, 889-895).

The applicant has demonstrated that, unexpectedly, the incorporation of colloidal silica during the preparation of PBS makes it possible to obtain a highly film-blowable composite material.

This PBS- and colloidal silica-based composite material can be obtained more rapidly than with the conventional processes for manufacturing film-blowable PBS. It has a high elongation at break, whatever the direction in which the material is stressed.

The applicant has thus also developed a process for the film blowing of films of this composite.

DETAILED DESCRIPTION OF THE INVENTION

The present invention relates to PBS- and silica-based composites.

Preparation of a PBS- and Silica-Based Composite:

The present invention relates to a process for preparing a PBS- and silica-based composite, comprising the following two steps:

formation of oligomers by reacting succinic acid or at least one succinic acid diester with 1,4-butanediol (step 1), and transesterification and coupling of the oligomers formed in the first step (step 2), and comprising the addition of colloidal silica in situ at the beginning of or during step 1 or at the beginning of or during step 2.

Thus, according to the first variant where succinic acid is used for the formation of oligomers, the preparation of the composite according to the invention comprises the following two steps:

1) First step: esterification and formation of oligomers by reacting succinic acid with 1,4-butanediol, for example according to the scheme:

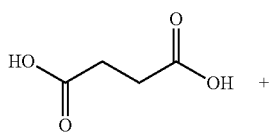

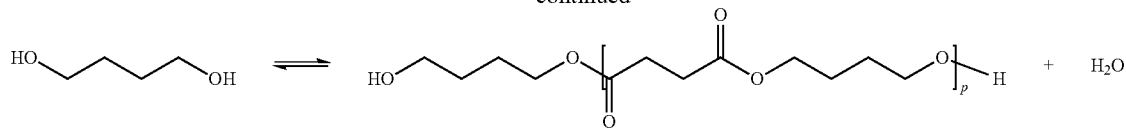

2) Second step: transesterification and coupling of the oligomers formed in the first step so as to form a polymer, for example according to the following scheme:

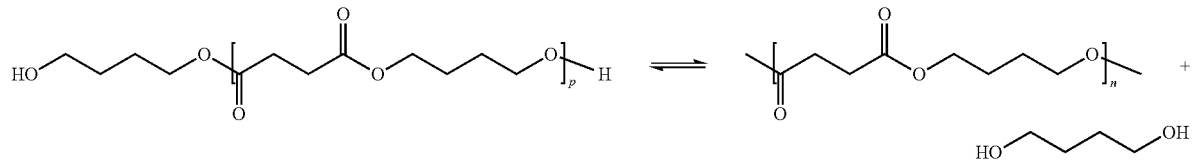

According to the second variant where the succinic acid diester is used, the process is identical, except for the fact that the first step of oligomer formation is carried out by transesterification of succinic acid ester and of 1,4-butanediol: an oligomer and an alcohol are then formed during this step 1 of this variant.

According to the first variant, the first step is carried out with partial or total removal of the water formed during the esterification reaction between a succinic acid molecule and a 1,4-butanediol molecule. In the case of the second variant, partial or total removal of the alcohol resulting from the transesterification reaction of the diester and of the 1,4-butanediol is carried out. According to each of the two variants, the first step can be carried out in the presence of an esterification or transesterification catalyst, in particular if said catalyst is inert with respect to the water and/or to the alcohol formed. The first step is carried out in the presence of a number of equivalents of 1,4-butanediol, relative to the succinic acid or relative to the succinic acid diester, capable of varying to a large extent, in particular between 0.5 and 10 equivalents, advantageously between 0.8 and 2 equivalents, and preferentially between 0.9 and 1.2 equivalents of 1,4-butanediol relative to the succinic acid or to the succinic acid diester. Preferably, the first step is carried out in the presence of an excess of 1,4-butanediol relative to the succinic acid or to the succinic acid diester, for example between 1.02 and 1.2 equivalents.

The second step is preferably carried out in the presence of a transesterification catalyst. This catalyst can be introduced at the beginning of or during step 1. The catalyst can alternatively be added at the beginning of or during step 2, in particular if it is sensitive to the water and/or to the alcohol possibly formed in step 1. Preferably, the catalyst is introduced at the beginning of step 2. This catalyst can, for example, be a zirconium-based catalyst.

The oligomers formed at the end of step 1 preferably have OH end groups.

The number of units p can vary to a large extent, in particular according to the characteristics desired for the oligomer. p preferably ranges between 5 and 20 and preferentially between 10 and 17.

The first and/or the second steps can be carried out in the presence of at least one branching agent, which takes part in the formation of oligomers and/or in the transesterification as a comonomer. Preferably, the first step is carried out in the presence of at least one branching agent.

Those skilled in the art optimize the reaction conditions so that the oligomers obtained at the end of step 1 have the desired characteristics (in particular value of p and/or nature of the end groups). Step 1 is advantageously carried out under an inert atmosphere. Step 1 can be carried out at atmospheric pressure or slightly under pressure, for example between 1 and 4 bar. The temperature during step 1 is advantageously between 190 and 235° C.

The second step is advantageously carried out at reduced pressure, in particular at a pressure below 5 mbar, preferably at a pressure of between 0.01 and 1 mbar, for example between 0.5 and 1 mbar.

The second step is carried out with partial or total removal of the 1,4-butanediol produced during the coupling of two oligomers.

The temperature during step 2 is advantageously between 200 and 260° C.

In the present invention, when a "partial or total removal" of a constituent resulting from a reaction is carried out, at least 90 mol % of this constituent are preferably removed from this reactor, or even at least 95%, or even at least 99%. The removal can be carried out continuously during the reaction, for example by distillation.

The number of units n can vary to a large extent, in particular according to the characteristics desired for the polymer. n is greater than or equal to p. n advantageously ranges between 60 and 500, preferably in the range of from 200 to 350.

The silica is preferably added at the beginning of the synthesis process, i.e. at the beginning of step 1.

Alternatively, the silica can be added during polymerization, i.e. during step 1, between step 1 and step 2 (i.e. at the beginning of step 2), or during step 2.

The expression "at the beginning" of a step means at a moment at which the reagents of the step have not begun to react. The expression "during" a step means at a moment at which the reaction between the reagents has already begun, but has not yet finished. It is a moment at which a part of the reagents have already been converted into product, and/or into an intermediate compound.

The colloidal silica is preferably added in situ, at the beginning of step 1, for example at the moment the reagents are charged.

A subject of the invention is a process for preparing PBS- and silica-based composites, comprising the addition of colloidal silica in situ to the reaction mixture comprising succinic acid and 1,4-butanediol, or comprising a product resulting from the reaction between succinic acid and 1,4-butanediol. Preferably, the preparation process according to the invention comprises the two steps of oligomer formation and of transesterification as described above.

Another subject of the present invention is a PBS- and silica-based composite obtained by means of the process according to the invention.

The total weight of the composite consists of the sum of the weights of PBS obtained and of silica.

Catalyst

The catalyst that can be used for the polymerization can be any catalyst conventionally used for the polymerization of PBS for the first and/or the second step of the process of the invention.

A catalyst which is of use in the esterification first step can be chosen in particular from para-toluenesulfonic acid (PTSA) and methanesulfonic acid (MSA).

The catalysts that can be used in particular during the transesterification second step are, for example, those described in paragraphs [0090] to [0094] of patent EP 1882712 B1. By way of examples, mention may be made of the organic or inorganic catalysts comprising a chemical element chosen from titanium, germanium, antimony, tin, bismuth, hafnium, magnesium, aluminum and lithium, or a mixture of these catalysts. It may, for example, be germanium oxide, zirconium tetra-n-butylate or titanium tetra-n-butylate. The amount of catalyst used can be between 50 ppm and 1500 ppm by weight of element relative to the total weight of the composite, preferably between 100 and 1200 ppm. In one embodiment of the invention, the catalyst comprises zirconium as element; it is preferably zirconium tetra-n-butylate. Preferentially, the amount of zirconium catalyst is between 600 and 1200 ppm by weight of element relative to the total weight of the composite. The use of zirconium makes it possible in particular to limit the coloration of the composite obtained.

Succinic Acid

The succinic acid used according to the first variant of the invention for the synthesis of the composite is preferably derived from agro-resources, or biobased, but can also be petroleum-based. For example, the succinic acid can be produced by fermentation using renewable non-fossil raw materials, in particular according to the teaching of application WO 2011/064151.

Succinic Acid Diester

The succinic acid diester used for the synthesis of the composite according to the second variant of the invention is advantageously a dialkyl succinate, for example a dimethyl or diethyl succinate, preferentially a dimethyl succinate. It can be obtained by esterification reaction of the succinic acid described above.

1,4-Butanediol

The 1,4-butanediol used in the present invention preferably results from the hydrogenation of biobased succinic acid or from fermentative processes using appropriate microorganisms. It is also possible to use petroleum-based 1,4-butanediol.

Colloidal Silica:

The silica used in the present invention is a colloidal silica, preferably dispersed in water. The number-average diameter of the silica is generally less than 100 nm, preferably less than 20 nm; it is preferably equal to 12 nm. The average diameter of the silica particles can be measured using transmission electron microscopy.

A colloidal silica is, as generally accepted in the art, a stable suspension of non-agglomerated particles of silica, these particles advantageously having a shape close to sphericity.

The colloidal silica can be a suspension of silica in water, of which the amount by weight of silica ranges from 1% to 50% relative to the total weight of water and of dispersed silica, preferentially from 10% to 40%.

The use of colloidal silica in the process of the invention is very easy and makes it possible in particular to obtain a very homogeneous dispersion of the silica in the composite, as can be seen, for example, by transmission electron microscopy (FIG. 1).

The specific surface area of the colloidal silica used in the present invention is generally greater than or equal to approximately 50 $m^2/g$, preferably greater than or equal to approximately 200 $m^2/g$.

Among the colloidal silicas that can be used in the present invention, mention may be made of the silicas sold under the name Klebosol® in suspension in water, in particular the silicas having the references 30 HB 50 K (50 nm) and 20H12 (12 nm) sold by the company AZ Electronic Materials.

The amount of colloidal silica incorporated into the PBS can vary to a large extent according to the characteristics desired for the film synthesized. In particular, the amount of colloidal silica can be between (limits excluded) 0 and 5%, preferably between 0.1% and 1%, in particular between 0.4% and 1% by weight of dry silica relative to the total weight of composite. The amount of colloidal silica can be between 0.6% and 0.8% by weight of dry silica relative to the total weight of composite. Highly preferably, the amount of colloidal silica is between 0.45% and 0.75% by weight of dry silica relative to the total weight of composite. The incorporation of colloidal silica according to the invention during the synthesis makes it possible to more rapidly obtain a polymer capable of being converted into the form of a film. Thus, the residence time of the polymer in the reactor is decreased, thereby minimizing, on the one hand, the degradation processes and, on the other hand, the coloration of the polymer.

Branching Agent

The polymer matrix (PBS) of the composites described in the present invention may or may not contain at least one comonomer, the functionality of which is greater than 2, as branching agent. In the present invention, the terms "poly (butylene succinate)" and "PBS" also include a PBS comprising within the polymer one or more branching agent monomers. The reactive functions of these branching agents can be of carboxylic acid, hydroxide, epoxide or isocyanate type, preferably carboxylic acid or hydroxide type. The functionality of these branching agents can be from 3 to 6, preferably from 3 to 4.

Among the branching agents conventionally used, mention may be made of: malic acid, citric or isocitric acid, tartaric acid, trimesic acid, tricarballylic acid, cyclopentanetetracarboxylic acid, glycerol, pentaerythritol, trimethylolpropane or ethers of these polyols, such as glyceryl propoxylate (sold under the name Voranol 450 by Dow Chemical). In the present invention, the amount of this branching agent can range between 0 and 1 mol %, preferably between 0.02 and 0.2 mol %, relative to the succinic acid.

Forming of the Composites According to the Invention

The thermoplastic polymers can be formed in various ways, in particular by extrusion, by blown film extrusion (film blowing) or film blowing extrusion or hollow body extrusion blow molding, by injection molding, by textile spinning or by calendering. The forming by film blowing makes it possible to produce thermoplastic polymer films of large size.

The composites according to the invention are particularly suitable for forming by film blowing.

In the case of synthesis of a composite obtained according to the process of the invention, and a PBS according to a process which is identical but without using colloidal silica, the applicant has noted that the composite has a better film blowing ability than in the equivalent PBS manufactured without silica. The composites according to the invention are therefore more film-blowable than the conventional PBSs without silica filler. Indeed, the bubble created during the film blowing is excellent when the composites manufactured according to the invention are film blown. Conventionally, the film blowing ability of a polymer is explained by its ability to be able to be stretched two-dimensionally. The film blowing ability of a polymer cannot be directly linked to its viscosity. The film blowing ability of the composites in the present invention is evaluated by studying the limiting take-up ratio (TUR) in a blown film extrusion manipulation (see examples 1 to 3 and comparative example 4).

A subject of the invention is a process for the film blowing of a film of a composite according to the invention. The film blowing process comprises the forming of the composite according to the invention by film blowing.

This process, well known to those skilled in the art, is generally carried out by continuously feeding the film formed with a polymer in the molten state using an extruder; the term extrusion-sheathing or film blowing extrusion is also used.

Another subject of the invention is a film of composite according to the invention, preferably obtained by means of the film blowing process according to the invention.

The film according to the invention generally has a thickness of between 5 and 1000 µm, preferably between 10 and 50 µm. The silica particles included in the film are as described in the section "colloidal silica" above.

Mechanical Properties of the Composites and Films According to the Invention

The films according to the invention have an elongation at break which is greater than that obtained for films of PBS without silica filler, thereby differing from the observations of Vassiliou. The longitudinal or transverse elongation at break of the films according to the invention is, for example, between 400% and 1200%, preferably between 600% and 800%, under conditions in which a conventional PBS film will have an average longitudinal or transverse elongation of approximately 200%.

The modulus and the tensile strength of the films according to the invention are, overall, similar to those obtained for conventional PBS films without silica filler.

The composites according to the invention have a reduced viscosity in solution (IV) (see conditions of the examples) greater than that of a conventional PBS without silica filler, in particular their reduced viscosity in solution is between 200 and 240 ml/g, for example between 200 and 220 ml/g.

The composites according to the invention have a melt flow rate (MFR) under stress which is less than that of a PBS produced under the same conditions (identical transesterification temperature and time) without silica filler. The melt flow rate of the composites according to the invention, measured at a temperature of 190° C., is advantageously between 3 and 30 g/10 min, preferentially between 10 and 30 g/10 min for a stress of 2.16 kg.

The composites according to the invention are film-blowable, while preferably retaining a weak coloration, i.e. the composite has, according to the known CIE Lab measuring method, parameters preferentially such that $L^*>60$, $a^*<2$ and $b^*<2$.

The coloration is evaluated using the modified Hunter parameters $L^*$, $a^*$ and $b^*$. The $L^*$ values measure the luminosity, oscillating between 0 (for black) and 100 (for white); the $a^*$ values measure the red (positive values) and green (negative values) tonalities; the $b^*$ values measure the yellow (positive values) and blue (negative values) tonalities.

Other aspects and advantages of the present application will emerge on reading the examples which follow, which should be considered to be nonlimiting illustrations.

DESCRIPTION OF THE FIGURES

FIG. 1: TEM images of polymer films:
(a) and (b): film according to the invention obtained by film blowing of a PBS- and colloidal silica-based composite according to the invention,
(c): film of a PBS- and fumed silica-based composite.

EXAMPLES

The invention is illustrated by examples 1 to 3 and comparative examples 4 and 5 in which unmodified (i.e. without silica nanofiller) and modified (i.e. comprising a nanofiller of colloidal and fumed silica) poly(butylene succinate)s are used for film blowing applications.

The properties of the polymers were studied with the following techniques:

The amount of terminal carboxylic functions (acid value, AV) is determined by potentiometric titration. The polymer is first of all dissolved in chloroform, and then titrated with a solution of sodium hydroxide in methanol. The result is subsequently expressed as the potassium hydroxide equivalent (in mg/g) required to neutralize the solution.

The coloration of the polymer is measured on the granules using a Konica Minolta CD2300 spectrophotometer. The results are expressed in the Hunter system of reference using the $L^*$, $a^*$ and $b^*$ parameters.

The melt flow rates (MFRs) of the various polyesters are examined using a grader of ats farr extrusion plastometer type. All the measurements were carried out according to ASTM standard D 1238-82 at 190° C. with a weight of 2.16 kg.

Furthermore, the reduced viscosity in solution was evaluated using a Ubbelohlde capillary viscometer at 25° C. in an equal weight mixture of phenol and ortho-dichlorobenzene after dissolution of the polymer at 130° C. with stirring. For these measurements, the polymer concentration introduced is 0.5 g/l.

The thermal properties (glass transition, crystallization temperature, melting point and degree of crystallinity) are determined by differential scanning calorimetry (DSC) at 10° C./min.

The mechanical properties of the films obtained by blown film extrusion are examined under uniaxial tensile stress at a speed of 50 mm/min. The dumbbell-type test specimens used have the following dimensions: a thickness of approximately 30 to 50 µm, a width of 4 mm and a nominal length of 10 mm.

Preparation of the Polyesters

Example 1

1513.6 g of 1,4-butanediol, 1889.0 g of succinic acid and 68.8 g of a dispersion at 20% by weight of colloidal silica (Klebosol 20H12, diameter 12 nm), i.e. a silica content of 0.5% by weight relative to the final polymer, are added to a 7.5 l reactor. The reaction mixture is then heated to 225° C. (4°

C./min) under a pressure of 2 bar and with constant stirring (150 rpm). The degree of esterification is estimated from the amount of distillate collected. The pressure is then reduced to 0.7 mbar and the temperature brought to 230° C. During the pressure reduction, 11.586 g of zirconium tetra-n-butylate are added as catalyst. These transesterification conditions are maintained for 350 min. Finally, a rod of polymer is cast via the reactor outlet valve, cooled in a thermoregulated tank of water and cut up in the form of granules of approximately 15 mg.

The resulting resin has a melt flow rate of 27 g/10 min (190° C., 2.160 kg), a reduced viscosity in solution of 208 ml/g and an acidity of 2.7 mg/g. The melting point of the polymer is 116° C., its glass transition is −31° C., its crystallization temperature is 57° C. and its degree of crystallinity is 30%. The coloration of the polymer, expressed according to the Hunter parameters, is the following: L*=73, a*=−1.0 and b*=−1.0.

Example 2

1513.6 g of 1,4-butanediol, 1886.3 g of succinic acid, 5.58 g of malic acid and 68.8 g of a dispersion at 20% by weight of colloidal silica (Klebosol 20H12, diameter 12 nm), i.e. a silica content of 0.5% by weight relative to the final polymer, are added to a 7.5 l reactor. The reaction mixture is then heated to 225° C. (4° C./min) under a pressure of 2 bar and with constant stirring (150 rpm). The degree of esterification is estimated from the amount of distillate collected. The pressure is then reduced to 0.7 mbar and the temperature brought to 230° C. During the pressure reduction, 11.586 g of zirconium tetra-n-butylate are added as catalyst. These transesterification conditions are maintained for 350 min. Finally, a rod of polymer is cast via the reactor outlet valve, cooled in a thermoregulated tank of water and cut up in the form of granules of approximately 15 mg.

The resulting resin has a melt flow rate of 11 g/10 min (190° C., 2.160 kg), a reduced viscosity in solution of 222 ml/g and an acidity of 3.1 mg/g. The melting point of the polymer is 113° C., its glass transition is −31° C., its crystallization temperature is 59° C. and its degree of crystallinity is 30%. The coloration of the polymer, expressed according to the Hunter parameters, is the following: L*=76, a*=−1.4 and b*=−0.2.

Example 3

1513.6 g of 1,4-butanediol, 1889.0 g of succinic acid and 96.4 g of a dispersion at 20% by weight of colloidal silica (Klebosol 20H12, diameter 12 nm), i.e. a silica content of 0.7% by weight relative to the final polymer, are added to a 7.5 l reactor. The reaction mixture is then heated to 225° C. (4° C./min) under a pressure of 2 bar and with constant stirring (150 rpm). The degree of esterification is estimated from the amount of distillate collected. The pressure is then reduced to 0.7 mbar and the temperature brought to 230° C. During the pressure reduction, 11.586 g of zirconium tetra-n-butylate are added as catalyst. These transesterification conditions are maintained for 350 min. Finally, a rod of polymer is cast via the reactor outlet valve, cooled in a thermoregulated tank of water and cut up in the form of granules of approximately 15 mg.

The resulting resin has a melt flow rate of 25 g/10 min (190° C., 2.160 kg), a reduced viscosity in solution of 214 ml/g and an acidity of 2.7 mg/g. The melting point of the polymer is 116° C., its glass transition is −32° C., its crystallization temperature is 60° C. and its degree of crystallinity is 29%. The coloration of the polymer, expressed according to the Hunter parameters, is the following: L*=75, a*=−1.0 and b*=−1.2.

Comparative Example 4

1513.6 g of 1,4-butanediol and 1889.0 g of succinic acid are added to a 7.5 l reactor. The reaction mixture is then heated to 225° C. (4° C./min) under a pressure of 2 bar and with constant stirring (150 rpm). The degree of esterification is estimated from the amount of distillate collected. The pressure is then reduced to 0.7 mbar and the temperature brought to 230° C. During the pressure reduction, 11.586 g of zirconium tetra-n-butylate are added as catalyst. These transesterification conditions are maintained for 350 min. Finally, a rod of polymer is cast via the reactor outlet valve, cooled in a thermoregulated tank of water and out up in the form of granules of approximately 15 mg.

The resulting resin has a melt flow rate of 50-60 g/10 min (190° C., 2.160 kg), a reduced viscosity in solution of 160 ml/g and an acidity of 2.2 mg/g. The melting point of the polymer is 116° C., its glass transition is −32° C., its crystallization temperature is 60° C. and its degree of crystallinity is 30%. The coloration of the polymer, expressed according to the Hunter parameters, is the following: L*=74, a*=−0.8 and b*=−0.9.

Comparative Example 5

1513.6 g of 1,4-butanediol, 1889.0 g of succinic acid and 114.8 g of a dispersion at 12% by weight of fumed silica (HDK N20 D2012, Wacker Chemic), i.e. a silica content of 0.5% by weight relative to the final polymer, are added to a 7.5 ml reactor. The reaction mixture is then heated to 225° C. (4° C./min) under a pressure of 2 bar and with constant stirring (150 rpm). The degree of esterification is estimated from the amount of distillate collected. The pressure is then reduced to 0.7 mbar and the temperature brought to 230° C. During the pressure reduction, 11.586 g of zirconium tetra-n-butylate are added as catalyst. These transesterification conditions are maintained for 350 min. Finally, a rod of polymer is cast via the reactor outlet valve, cooled in a thermoregulated tank of water and cut up in the form of granules of approximately 15 mg.

The resulting resin has a melt flow rate of 22 g/10 min (190° C., 2.160 kg), a reduced viscosity in solution of 203 ml/g and an acidity of 3.4 mg/g. The melting point of the polymer is 113° C., its glass transition is −34° C., its crystallization temperature is 65° C. and its degree of crystallinity is 32%.

This comparative example is directly comparable with example 1.

The film blowing ability of these various polyesters is compared by blown film extrusion, for a film blow up ratio kept constant at around 3. Then, for each of these samples, the maximum longitudinal film take up ratio (TUR) is determined. The results of these film blowing tests and also the properties of the associated films are given in the following tables:

|  | Extrusion flow rate (kg/h) | Longitudinal take up ratio | | | | | | | | |
|---|---|---|---|---|---|---|---|---|---|---|
|  |  | 2 | 4 | 6 | 8 | 10 | 12 | 14 | 16 | 18 | 20 |
| Ex.1 | 2.4 |  |  | ++ | ++ | ++ | + | − | −− |  |  |
|  | 3.6 |  | ++ | ++ | ++ | + |  | − | −− |  |  |

-continued

| | Extrusion flow rate (kg/h) | Longitudinal take up ratio | | | | | | | | | |
|---|---|---|---|---|---|---|---|---|---|---|---|
| | | 2 | 4 | 6 | 8 | 10 | 12 | 14 | 16 | 18 | 20 |
| Ex.2 | 2.4 | | | ++ | ++ | + | − | −− | | | |
| | 3.6 | | ++ | ++ | + | − | −− | | | | |
| Ex.3 | 2.4 | | | ++ | ++ | ++ | ++ | − | −− | | |
| | 3.6 | | ++ | ++ | ++ | ++ | ++ | ++ | ++ | − | − |
| CEx.4 | 2.4 | | | GI | | | | | | | |
| | 3.6 | | GI | | | | | | | | |

++: No hole observed in the film formed, and film stable;
+: Some holes observed in the film, and film slightly unstable;
−: Some holes observed in the film, and film unstable;
−−: Large holes observed in the film, and film very unstable;
GI: Film blowing of the film impossible

| | Modulus (MPa) | | Tensile strength (MPa) | | Elongation at break (%) | |
|---|---|---|---|---|---|---|
| | Par. | Perp. | Par. | Perp. | Par. | Perp. |
| Ex. 1 | 100 | 100 | 23 | 21 | 780 | 600 |
| Ex. 2 | 120 | 150 | 28 | 25 | 670 | 570 |
| Ex. 3 | 130 | 90 | 26 | 20 | 700 | 720 |
| CEx. 4 | 200 | 145 | 28 | 20 | 70 | 20 |
| CEx. 5 | 100 | 90 | 16 | 20 | 350 | 540 |

Par.: Parallel to the direction of extrusion/Perp.: Perpendicular to the direction of extrusion
Tests carried out according to ISO standard 527-3.

It can be concluded from examples 1 to 3 that the composite according to the invention has a high elongation at break and that this elongation is homogeneous, depending on the direction in which the material is stressed. Conversely, the prior art composites made from fumed silica, in particular those of Vassiliou, have lower elongations at break and, especially, an elongation which is nonhomogeneous depending on the direction of mechanical stress.

The invention claimed is:

1. A process for preparing a poly(butylene succinate) (PBS)- and silica-based composite, comprising the following two steps:
formation of oligomers by reacting succinic acid or at least one succinic acid diester with 1,4-butanediol (step 1) and a branching agent, and
transesterification and coupling of the oligomers formed in the first step (step 2),
and comprising the addition of colloidal silica in situ at the beginning of or during step 1 or at the beginning of or during step 2.

2. The process as claimed in claim 1, wherein the number-average diameter of the silica is less than 100 nm.

3. The process as claimed in claim 1, wherein the amount of silica is between 0 and 5% (limits excluded) by weight of dry silica relative to the total weight of composite.

4. The process as claimed in claim 1, wherein the branching agent is a monomer with 3 to 6 functional groups and wherein the functional groups are carboxylic acids, hydroxides, epoxides or isocyanates.

5. The process as claimed in claim 1, wherein the oligomer formation step and/or the transesterification step are carried out in the presence of a catalyst.

6. The process as claimed in claim 1, wherein step 1 is carried out at a pressure of between 1 and 4 bar and at a temperature of between 190 and 235° C.

7. The process as claimed in claim 1, wherein step 2 is carried out at a pressure below 5 mbar and at a temperature of between 200 and 260° C.

8. A process for preparing a film of a poly(butylene succinate) (PBS)- and silica-based composite, comprising—formation of oligomers by reacting succinic acid or at least one succinic acid diester with 1,4-butanediol and a branching agent (step 1), and—transesterification and coupling of the oligomers formed in the first step (step 2), and comprising addition of colloidal silica in situ at the beginning of or during step 1 or at the beginning of or during step 2, and comprising film blowing.

9. A film of PBS- and silica-based composite obtained by the film blowing process of claim 8.

* * * * *